United States Patent
Tsai et al.

(10) Patent No.: US 8,050,399 B2
(45) Date of Patent: Nov. 1, 2011

(54) POWER TRANSFORMATION DEVICE OF A POWERED DEVICE IN A POWER OVER ETHERNET SYSTEM

(75) Inventors: Yi-Chang Tsai, Taipei Hsien (TW); Kuo-Hung Tseng, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 1369 days.

(21) Appl. No.: 11/565,636

(22) Filed: Dec. 1, 2006

(65) Prior Publication Data
US 2008/0074906 A1  Mar. 27, 2008

(30) Foreign Application Priority Data
Sep. 27, 2006  (TW) .............................. 95135781 A

(51) Int. Cl.
*H04M 1/00*  (2006.01)
(52) U.S. Cl. .......... 379/413; 714/43; 439/676; 363/125; 379/30; 379/402
(58) Field of Classification Search ...... 379/413–413.01
See application file for complete search history.

(56) References Cited

U.S. PATENT DOCUMENTS

| | | | |
|---|---|---|---|
| 6,009,008 A * | 12/1999 | Pelly | 363/125 |
| 6,295,356 B1 | 9/2001 | De Nicolo | |
| 7,823,026 B2 * | 10/2010 | Karam et al. | 714/43 |
| 2006/0092826 A1 * | 5/2006 | Karam et al. | 370/216 |
| 2007/0015416 A1 * | 1/2007 | Gutierrez et al. | 439/676 |

FOREIGN PATENT DOCUMENTS

CN  1604546 A  4/2005

* cited by examiner

*Primary Examiner* — MD S Elahee
*Assistant Examiner* — Ibraham Sharifzada
(74) *Attorney, Agent, or Firm* — Winston Hsu; Scott Margo

(57) ABSTRACT

A power transformation device of a powered device in a power over Ethernet system includes a first transformer coupled between a first pin and a second pin of an Ethernet terminal, a second transformer coupled between a third pin and a sixth pin of the Ethernet terminal, and a bridge rectifier coupled between a center tap of the first transformer and a center tap of the second transformer, for rectifying power outputted from the center taps of the first transformer and the second transformer, so as to provide power for the powered device.

34 Claims, 7 Drawing Sheets

POWER TRANSFORMATION DEVICE OF A POWERED DEVICE IN A POWER OVER ETHERNET SYSTEM

BACKGROUND OF THE INVENTION

1. Field of the Invention

The present invention provides a power transformation device of a powered device in a power over Ethernet system, and more particularly, a power transformation device applicable to 10 Mbs, 100 Mbs, and 1000 Mbs powered devices in a power over Ethernet system 2. Description of the Prior Art Power over Ethernet (POE) means a technique for providing DC power for terminal equipments (ex. IP phone, wireless network access point, web-camera, etc.) during data transmission in a present Ethernet. A POE system is also named as a power over LAN (POL) system or an active Ethernet system, and is compatible with the present Ethernet system. The IEEE 802.3af standard is a new protocol of the POE system, and is extended from the IEEE 802.3 standard.

According to the IEEE 802.3af standard, a POE system comprises a power sourcing equipment (PSE) and a powered device (PD). The PSE, the management equipment of the POE system, provides power for the PD. The PD, which is a web-phone, web-camera, network access point, PDA, or other Ethernet devices, obtains power from an RJ-45 socket.

Powering the PD over the PSE system can be classified into two ways. One is powering the PD through the fourth and fifth pins and through the seven and eighth pins of an RJ-45 terminal as shown in FIG. 1, and the other is through the first and second pins and through the third and sixth pins of an RJ-45 terminal as shown in FIG. 2. Note that, Arabic numerals (1, 2 ... 8) shown in FIG. 1 and FIG. 2 represent pin numbers of a catalog-5 (Cat. 5) cable. When the PSE powers the PD through the fourth and fifth pins and through the seventh and eighth pins, the fourth and fifth pins are coupled to a positive electrode, and the seventh and eighth pins are coupled to a negative electrode. When the PSE powers the PD through the first and second pins and through the third and sixth pins, the first and second pins and the third and sixth pins are coupled to electrodes with opposite poles.

In addition, structures of the POE system can be also classified into two types. One is an end-span structure, and the other is a mid-span structure. Under the end-span structure, the PSE provides power for the PD by the way of FIG. 1 or FIG. 2. Under the mid-span structure as shown in FIG. 3, the PSE provides power for the PD through a midspan PSE by the way of FIG. 1.

According to the IEEE 802.3af standard, the PSE can provide power by either the way of FIG. 1 or the way of FIG. 2, while the PD must be applicable to both ways. Such requirement is easily achieved for designs of 10 Mbs and 100 Mbs PDs, because both of the 10 Mbs and the 100 Mbs PDs apply two twisted pairs of a Cat. 5 cable (the first and second pins and the third and sixth pins) for exchanging data, while the other two twisted pairs (the fourth and fifth pins and the seventh and eighth pin) are unused. Therefore, the 10 Mbs and the 100 Mbs PDs applicable to FIG. 1 or FIG. 2 can be easily achieved. However, a 1000 Mbs Ethernet equipment, unlike the 10 Mbs and the 100 Mbs PDs, applies all twist-pairs of a Cat. 5 cable for exchanging data, so that the prior art POE system shown in FIG. 1 to FIG. 3 is not suitable for 10 Mbs, 100 Mbs, and 1000 Mbs PDs.

SUMMARY OF THE INVENTION

It is therefore a primary objective of the claimed invention to provide a power transformation device of a powered device in a power over Ethernet system.

The present invention discloses a power transformation device of a powered device in a power over Ethernet system. The powered device comprises a first transformer coupled between a first pin and a second pin of an Ethernet terminal, a second transformer coupled between a third pin and a sixth pin of the Ethernet terminal, and a bridge rectifier coupled between a center tap of the first transformer and a center tap of the second transformer, for rectifying power outputted from the center taps of the first transformer and the second transformer, so as to provide power for the powered device.

The present invention further discloses a power transformation device of a powered device in a power over Ethernet system. The powered device comprises a first transformer coupled between a fourth pin and a fifth pin of an Ethernet terminal, a second transformer coupled between a seventh pin and an eighth pin of the Ethernet terminal, and a bridge rectifier coupled between a center tap of the first transformer and a center tap of the second transformer, for rectifying power outputted from the center taps of the first transformer and the second transformer, so as to provide power for the powered device.

The present invention further discloses a power transformation device of a powered device in a power over Ethernet system. The powered device comprises a first transformer coupled between a first pin and a second pin of an Ethernet terminal, a second transformer coupled between a third pin and a sixth pin of the Ethernet terminal, a first bridge rectifier coupled between a center tap of the first transformer and a center tap of the second transformer, for rectifying power outputted from the center taps of the first transformer and the second transformer, so as to provide power for the powered device, a third transformer coupled between a fourth pin and a fifth pin of the Ethernet terminal, a fourth transformer coupled between a seventh pin and an eighth pin of the Ethernet terminal, and a second bridge rectifier coupled between a center tap of the third transformer and a center tap of the fourth transformer, for rectifying power outputted from the center taps of the third transformer and the fourth transformer, so as to provide power for the powered device.

The present invention further discloses a power transformation device of a powered device in a power over Ethernet system. The powered device comprises a first transformer coupled between a first pin and a second pin of an Ethernet terminal, a second transformer coupled between a third pin and a sixth pin of the Ethernet terminal, a third transformer coupled between a fourth pin and a fifth pin of the Ethernet terminal, a fourth transformer coupled between a seventh pin and an eighth pin of the Ethernet terminal, a switching unit comprising a first end coupled to a center tap of the first transformer, a second end coupled to a center tap of the second transformer, a third end coupled to a center tap of the third transformer, a fourth end coupled to a center tap of the fourth transformer, a first output end, and a second output end, for alternately outputting voltages of the first end and the second end or voltages of the third end and the fourth end, and a bridge rectifier coupled between the first output end and the second output end of the switching unit, for rectifying power outputted from the first output end and the second output end, so as to provide power for the powered device.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
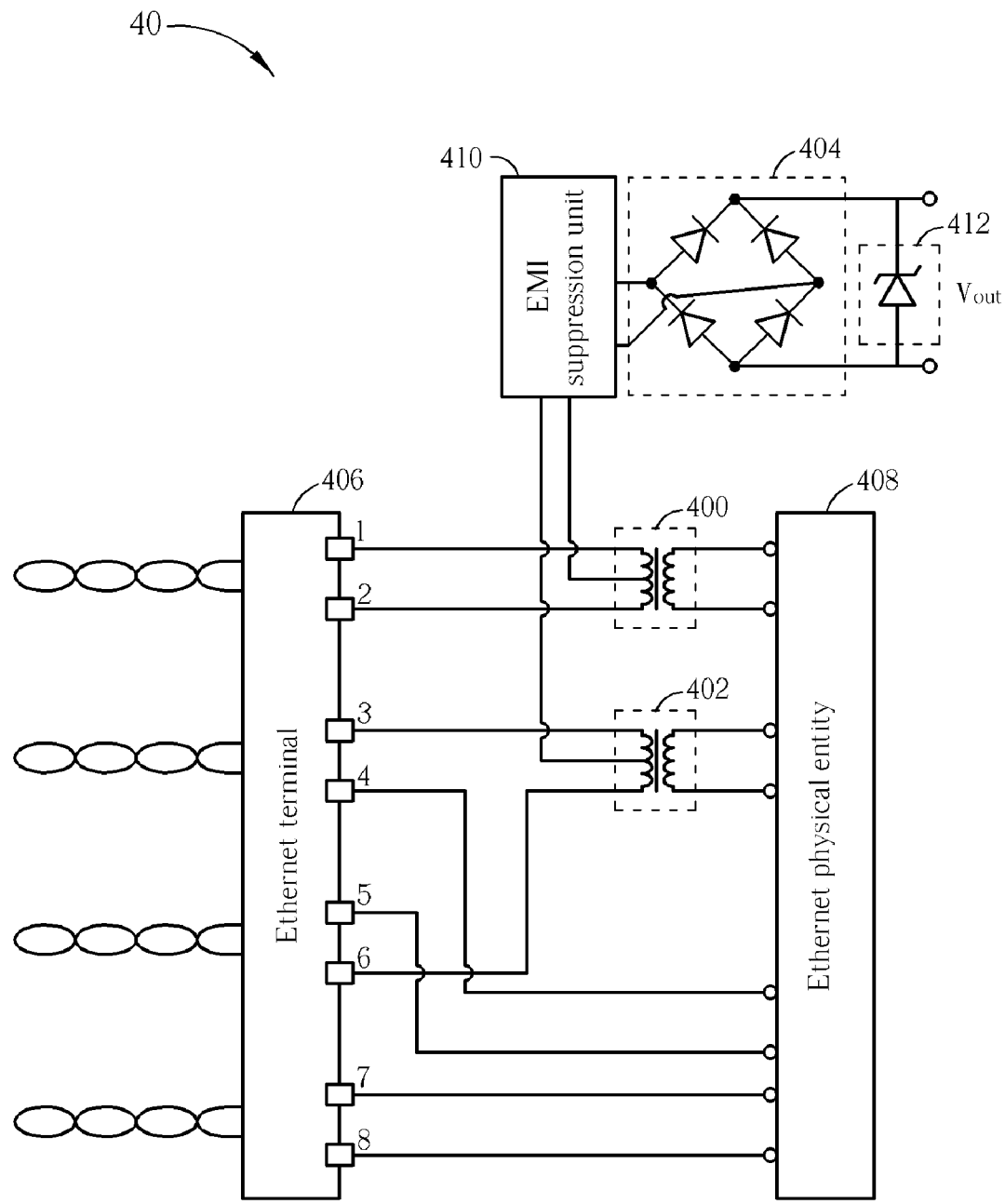
FIG. 4 illustrates a schematic diagram of a power transformation device in accordance with a first embodiment of the present invention.

Please refer to FIG. 4, which illustrates a schematic diagram of a power transformation device 40 in accordance with a first embodiment of the present invention. The power transformation device 40 is utilized in a PD of a POE system, and includes a first transformer 400, a second transformer 402, and a bridge rectifier 404. The power transformation device 40 transforms power of the POE system through an Ethernet terminal 406, and outputs voltage Vout for the PD. The power transformation device 40 does not affect operations of an Ethernet physical entity 408 of the PD. In FIG. 4, the Ethernet terminal 406 conforms to the RJ-45 terminal, and Arabic numerals (1, 2 . . . 8) thereof represent pin numbers. The first transformer 400 is coupled between the first pin and the second pin of the Ethernet terminal 406, and the second transformer 402 is coupled between the third pin and the sixth pin of the Ethernet terminal 406. Preferably, the bridge rectifier 404 is coupled between center taps of the first transformer 400 and the second transformer 402 through an EMI (electromagnetic interference) suppression unit 410, and is utilized for rectifying power outputted from the center taps of the first transformer 400 and the second transformer 402, and outputs the voltage Vout for the PD through a Zener diode 412. The EMI suppression unit 410 is utilized for suppressing or reducing EMI, which can be a common-mode choke, a bead inductor, or other units. The Zener diode 412 functions as a clamping unit for stabilizing the voltage Vout.

Figure 2:
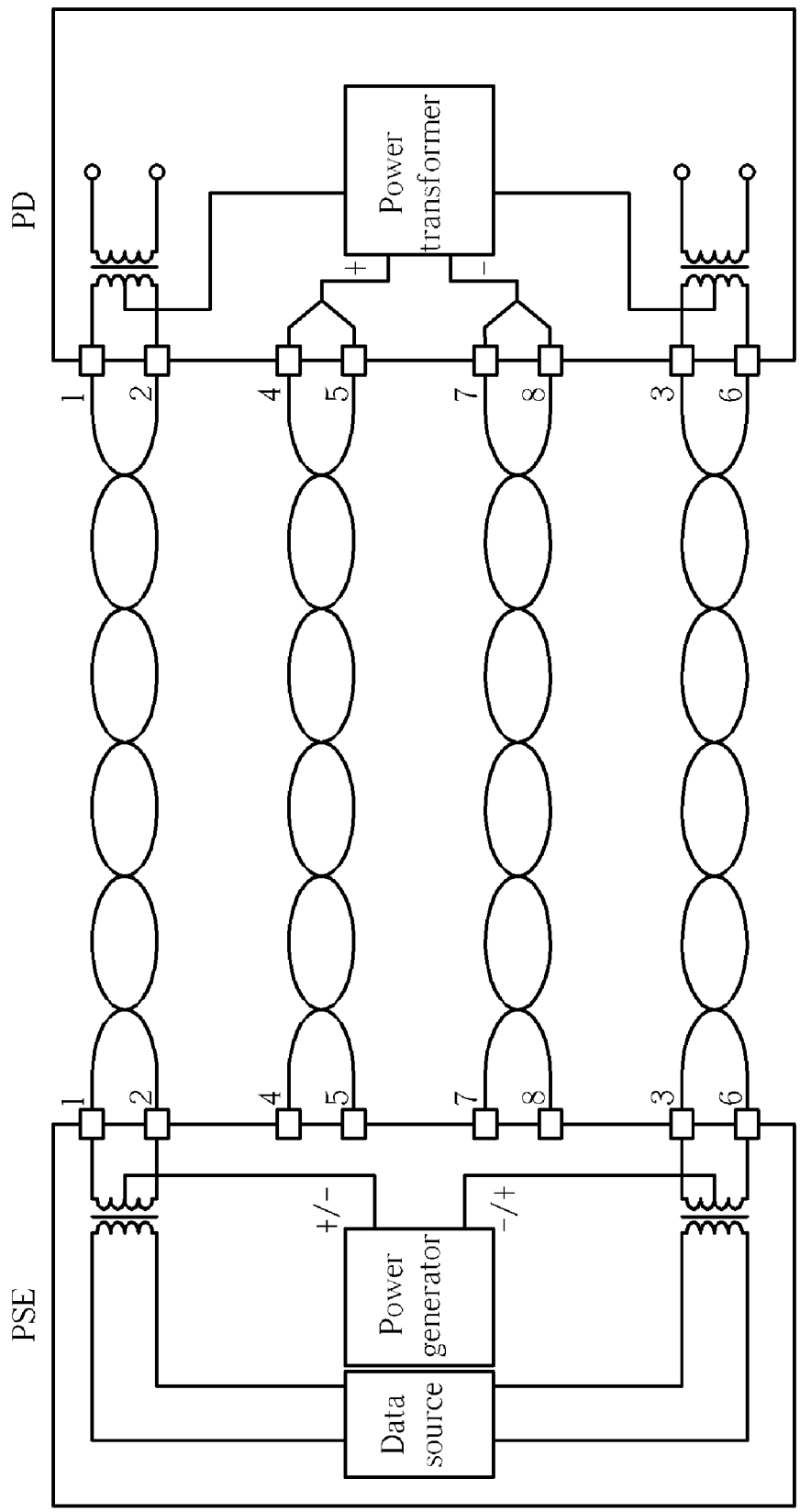
FIG. 2 illustrates a schematic diagram of a prior art POE system providing power through the first and second pins and through the third and sixth pins.
Figure 3:
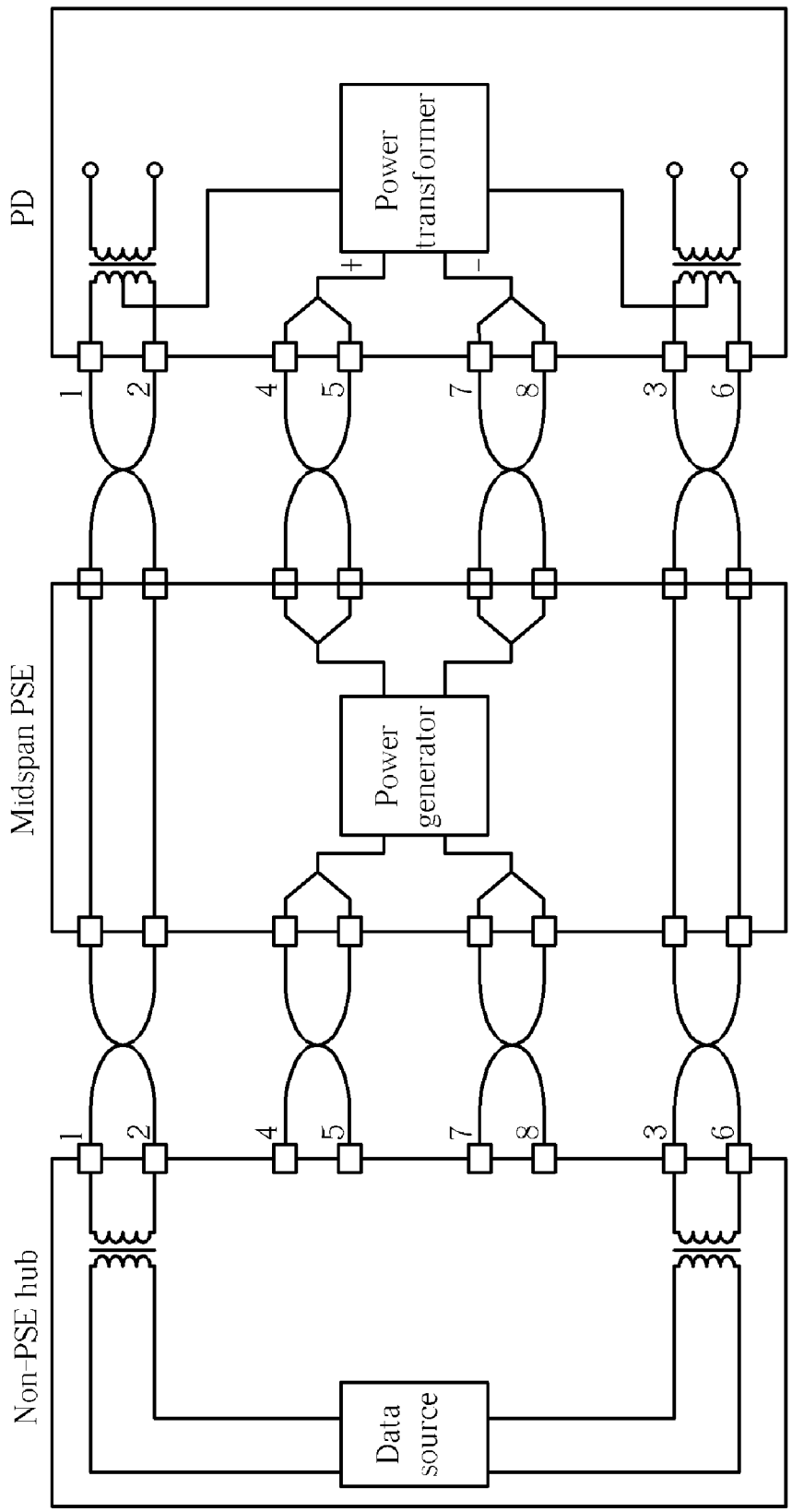
FIG. 3 illustrates a schematic diagram of a prior art mid-span POE system.

As shown in FIG. 4, the power transformation device 40 is suitable for the situation that the PSE provides power through the first and second pins and the third and sixth pins of the Ethernet terminal 406 as shown in FIG. 2. Under such circumstance, no matter what type (10 Mbs, 100 Mbs, or 1000 Mbs) the PD is, the power transformation device 40 can receive power from the PSE through the Ethernet terminal 406, and output power to the PD.

Figure 5:
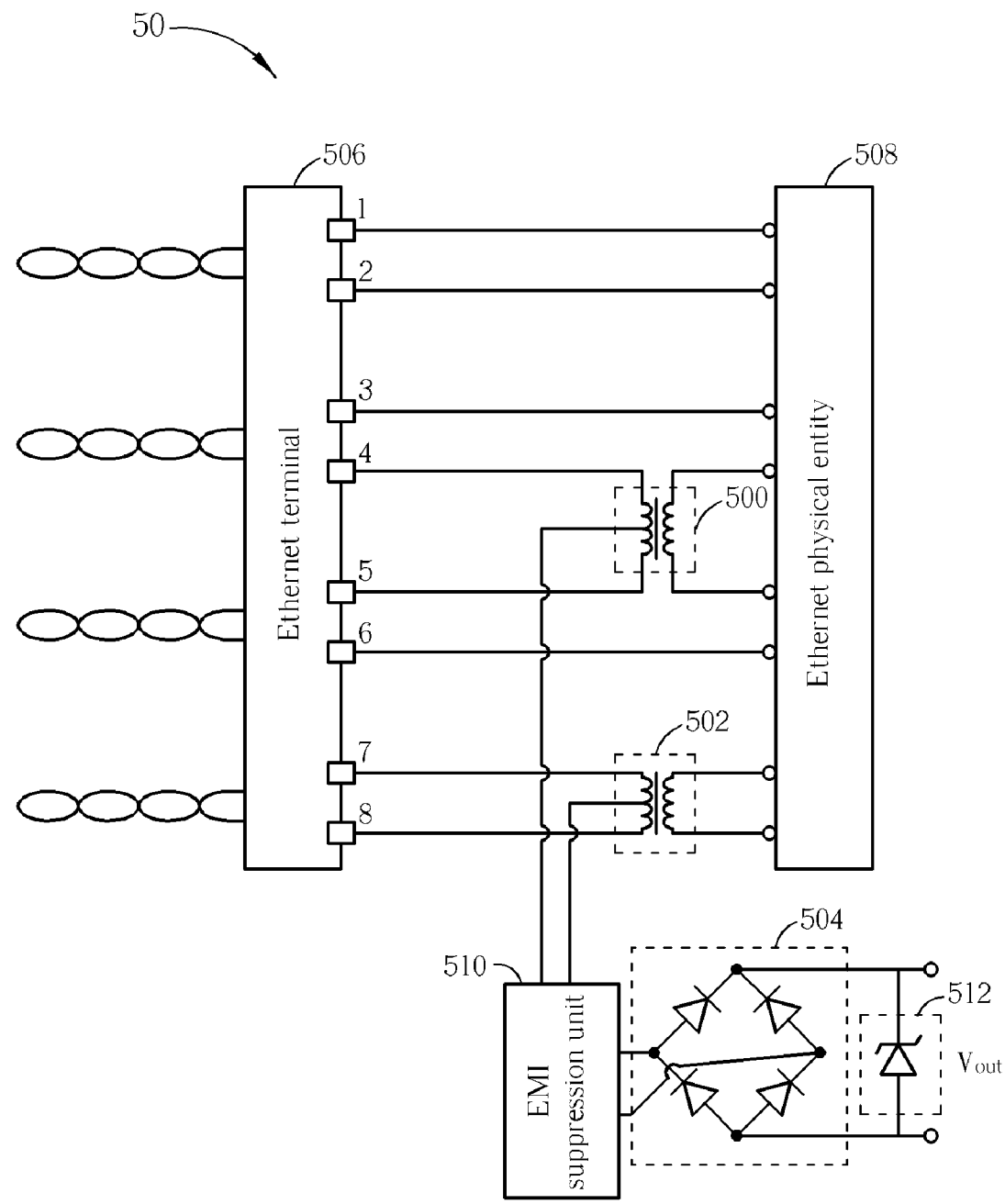
FIG. 5 illustrates a schematic diagram of a power transformation device in accordance with a second embodiment of the present invention.

Please refer to FIG. 5, which illustrates a schematic diagram of a power transformation device 50 in accordance with a second embodiment of the present invention. The power transformation device 50 is utilized in a PD of a POE system, and includes a first transformer 500, a second transformer 502, and a bridge rectifier 504. The power transformation device 50 transforms power of the POE system through an Ethernet terminal 506, and outputs voltage Vout for the PD. The power transformation device 50 does not affect operations of an Ethernet physical entity 508 of the PD. In FIG. 5, the Ethernet terminal 506 conforms to the RJ-45 terminal, and Arabic numerals (1, 2 . . . 8) thereof represent pin numbers.

The first transformer 500 is coupled between the fourth pin and the fifth pin of the Ethernet terminal 506, and the second transformer 502 is coupled between the seventh pin and the eighth pin of the Ethernet terminal 506. Preferably, the bridge rectifier 504 is coupled between center taps of the first transformer 500 and the second transformer 502 through an EMI (electromagnetic interference) suppression unit 510, and is utilized for rectifying power outputted from the center taps of the first transformer 500 and the second transformer 502, and outputs the voltage Vout for the PD through a Zener diode 512. The EMI suppression unit 510 is utilized for suppressing or reducing EMI, which can be a common-mode choke, a bead inductor, or other units. The Zener diode 512 functions as a clamping unit for stabilizing the voltage Vout.

Figure 1:
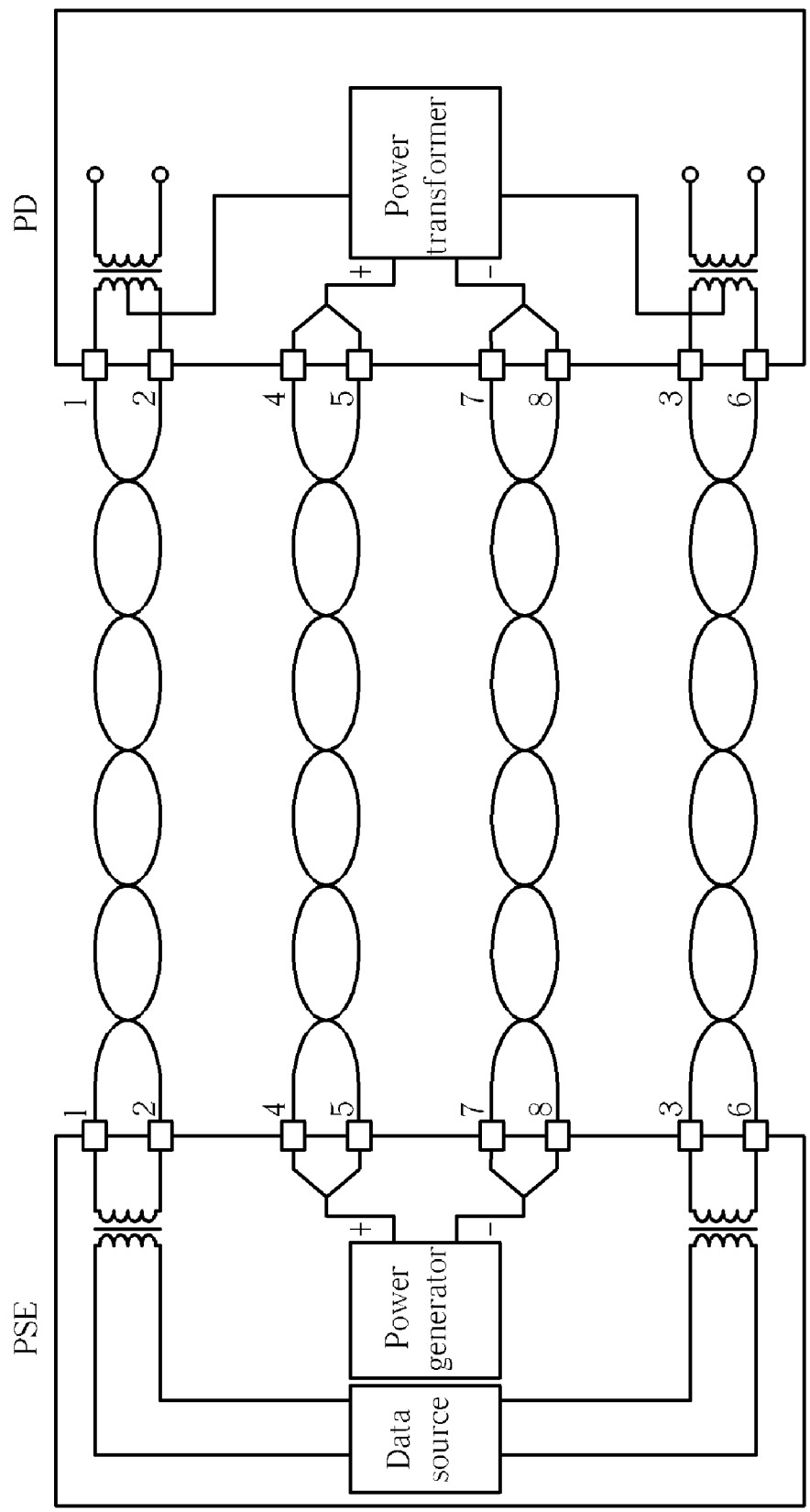
FIG. 1 illustrates a schematic diagram of a prior art POE system providing power through the fourth and fifth pins and through the seventh and eighth pins.

As shown in FIG. 5, the power transformation device 50 is suitable for the situation that the PSE provides power through the fourth and fifth pins and the seventh and eighth pins of the Ethernet terminal 506 as shown in FIG. 1. Under such circumstance, no matter what type (10 Mbs, 100 Mbs, or 1000 Mbs) the PD is, the power transformation device 50 can receive power from the PSE through the Ethernet terminal 506, and output power to the PD.

Therefore, the power transformation device 40 is suitable for the powering way shown in FIG. 2, while the power transformation device 50 is suitable for the powering way shown in FIG. 1. No matter what type (10 Mbs, 100 Mbs, or 1000 Mbs) the PD is, the power transformation device 40 or 50 can receive power from the PSE, and output power to the PD. Certainly, those skilled in the art can combine the power transformation devices 40 and 50 together, so as to provide a power transformation device suitable for both the powering ways of FIG. 1 and FIG. 2.

Figure 6:
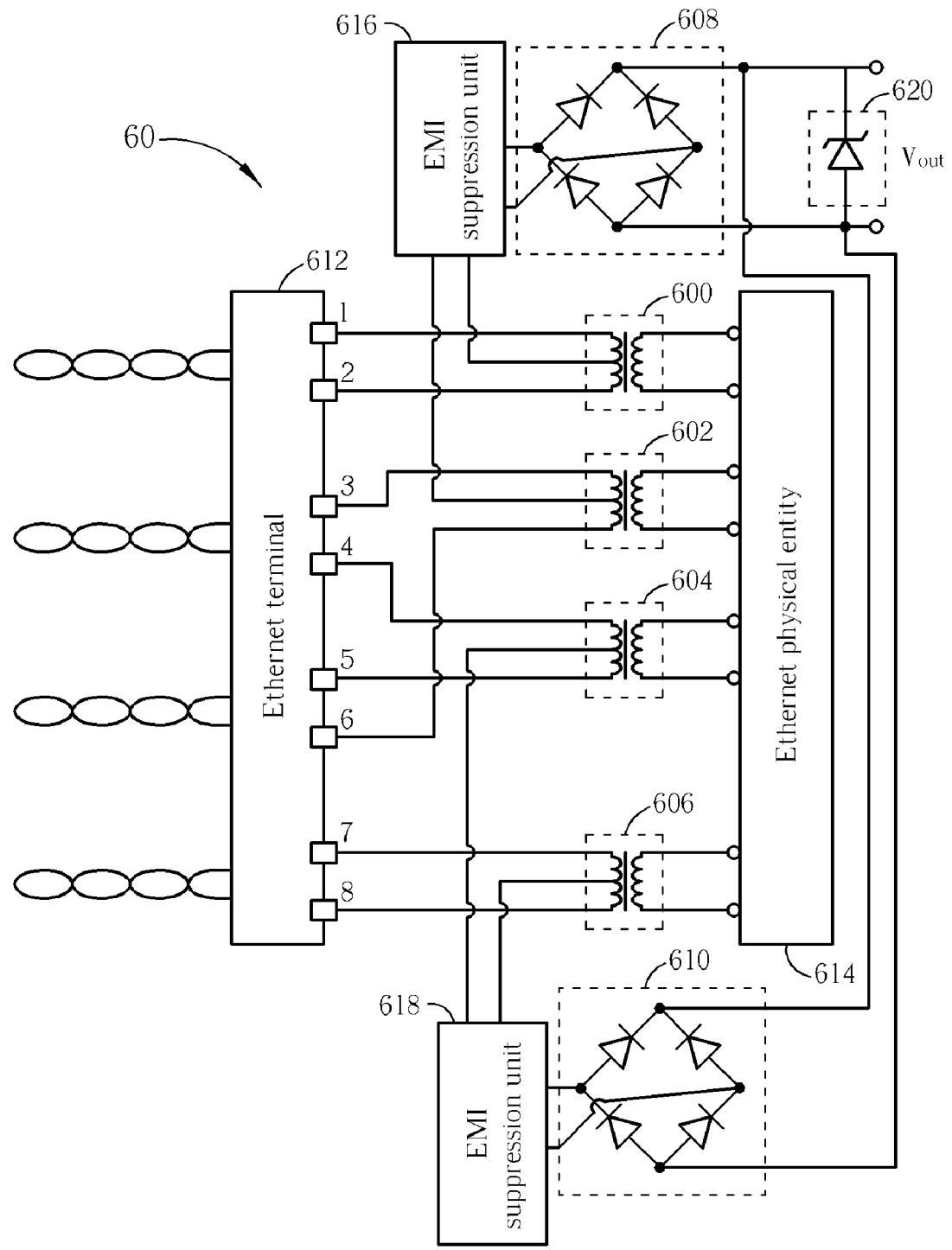
FIG. 6 illustrates a schematic diagram of a power transformation device in accordance with a third embodiment of the present invention.

Please refer to FIG. 6, which illustrates a schematic diagram of a power transformation device 60 in accordance with a third embodiment of the present invention. The power transformation device 60 is utilized in a PD of a POE system, and includes a first transformer 600, a second transformer 602, a third transformer 604, a fourth transformer 606, a first bridge rectifier 608, and a second bridge rectifier 610. The power transformation device 60 transforms power of the POE system through an Ethernet terminal 612, and outputs voltage Vout for the PD. The power transformation device 60 does not affect operations of an Ethernet physical entity 614 of the PD. In FIG. 6, the Ethernet terminal 612 conforms to the RJ-45 terminal, and Arabic numerals (1, 2 . . . 8) thereof represent pin numbers. The first transformer 600 is coupled between the first pin and the second pin of the Ethernet terminal 612, the second transformer 602 is coupled between the third pin and the sixth pin of the Ethernet terminal 612, the third transformer 604 is coupled between the fourth pin and the fifth pin of the Ethernet terminal 612, and the fourth transformer 606 is coupled between the seventh pin and the eighth pin of the Ethernet terminal 612. Preferably, the first bridge rectifier 608 is coupled between center taps of the first transformer 600 and the second transformer 602 through an EMI suppression unit 616, and is utilized for rectifying power outputted from the center taps of the first transformer 600 and the second transformer 602, and outputs the voltage Vout for the PD through a Zener diode 620. Similarly, the second bridge rectifier 610 is coupled between center taps of the third transformer 604 and the fourth transformer 606 through an EMI (electromagnetic interference) suppression unit 618, and is utilized for rectifying power outputted from the center taps of the third transformer 604 and the fourth transformer 606, and outputs the voltage Vout for the PD through the Zener diode 620. The EMI suppression units 616 and 618 are utilized for suppressing or reducing EMI, which can be common-mode chokes, bead inductors, or other units. The Zener diode 620 functions as a clamping unit for stabilizing the voltage Vout.

Therefore, the power transformation device 60 is suitable for the situation that the PSE provides power through the first and second pins and the third and sixth pins of the Ethernet terminal 612 as shown in FIG. 2, and for the situation that the PSE provides power through the fourth and fifth pins and the seventh and eighth pins as shown in FIG. 1. In addition, no matter what type (10 Mbs, 100 Mbs, or 1000 Mbs) the PD is, the power transformation device 60 can receive power from the PSE through the Ethernet terminal 612, and output power to the PD.

Figure 7:
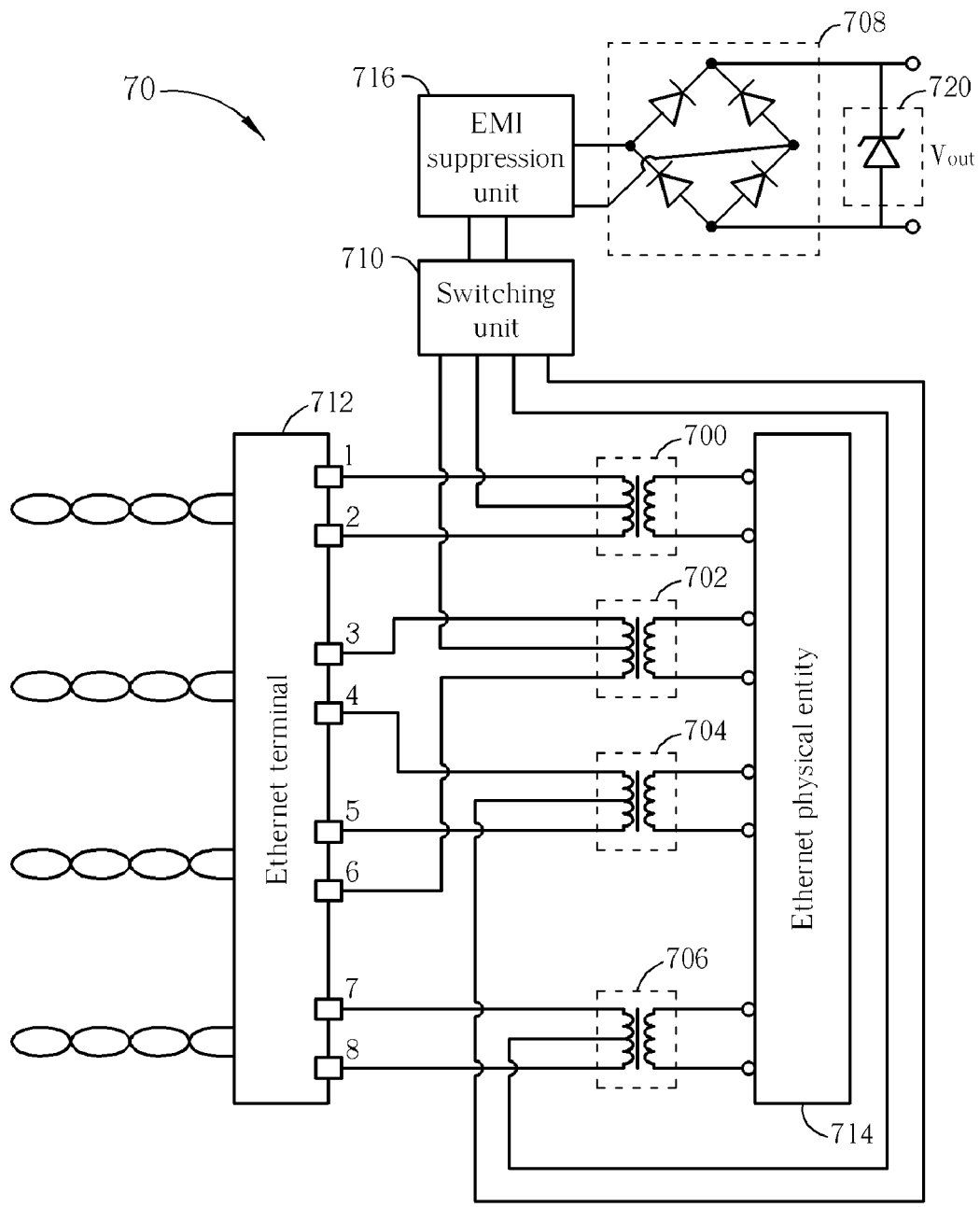
FIG. 7 illustrates a schematic diagram of a power transformation device in accordance with a fourth embodiment of the present invention.

Please refer to FIG. 7, which illustrates a schematic diagram of a power transformation device 70 in accordance with a fourth embodiment of the present invention. The power transformation device 70 is utilized in a PD of a POE system, and includes a first transformer 700, a second transformer 702, a third transformer 704, a fourth transformer 706, a bridge rectifier 708, and a switching unit 710. The power transformation device 70 transforms power of the POE system through an Ethernet terminal 712, and outputs voltage Vout for the PD. The power transformation device 70 does not affect operations of an Ethernet physical entity 714 of the PD. In FIG. 7, the Ethernet terminal 712 conforms to the RJ-45 terminal, and Arabic numerals (1, 2 . . . 8) thereof represent pin numbers. The first transformer 700 is coupled between the first pin and the second pin of the Ethernet terminal 712, the second transformer 702 is coupled between the third pin and the sixth pin of the Ethernet terminal 712, the third transformer 704 is coupled between the fourth pin and the fifth pin of the Ethernet terminal 712, and the fourth transformer 706 is coupled between the seventh pin and the eighth pin of the Ethernet terminal 712. The switching unit 710 is coupled to center taps of the first transformer 700, the second transformer 702, the third transformer 704, and the fourth transformer 706, and utilized for alternately outputting voltages of the center taps of the first transformer 700 and the second transformer 702 or voltages of the center taps of the third transformer 704 and the fourth transformer 706. Preferably, the bridge rectifier 708 is coupled to output ends of the switching unit 710 through an EMI suppression unit 716, and is utilized for rectifying power outputted from the switching unit 710, and outputs the voltage Vout for the PD through a Zener diode 720. The EMI suppression unit 716 is utilized for suppressing or reducing EMI, which can be a common-mode choke, a bead inductor, or other units. The Zener diode 720 functions as a clamping unit for stabilizing the voltage Vout.

Therefore, the power transformation device 70 is suitable for the situation that the PSE provides power through the first and second pins and the third and sixth pins of the Ethernet terminal 712 as shown in FIG. 2, and for the situation that the PSE provides power through the fourth and fifth pins and the seventh and eighth pins as shown in FIG. 1. In addition, no matter what type (10 Mbs, 100 Mbs, or 1000 Mbs) the PD is, the power transformation device 70 can receive power from the PSE through the Ethernet terminal 712, and output power to the PD.

The present invention power transformation device makes 10 Mbs, 100 Mbs, or 1000 Mbs PDs powered through a network cable, which saves time and costs of installing power lines.

Since the 1000 Mbs PD uses all twisted pairs and the 10 Mbs and 100 Mbs PDs use two twisted pairs for exchanging data, the prior art POE system cannot support the 10 Mbs, 100 Mbs, and 1000 Mbs PDs at the same time. Oppositely, no matter what type (10 Mbs, 100 Mbs, or 1000 Mbs) the PD is, power transformation devices of the present invention can receive power from the PSE through the Ethernet terminal, and output power to the PD, and maintain network operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power transformation device of a powered device in a power over Ethernet system comprising:
   a first transformer coupled between a first pin and a second pin of an Ethernet terminal;
   a second transformer coupled between a third pin and a sixth pin of the Ethernet terminal;
   an electromagnetic interference suppression unit coupled between a center tap of the first transformer and a center tap of the second transformer; and
   a bridge rectifier coupled to the electromagnetic interference suppression unit, for rectifying power outputted from the center taps of the first transformer and the second transformer via the electromagnetic interference suppression unit, so as to provide power for the powered device.

2. The power transformation device of claim 1, wherein the Ethernet terminal is an RJ-45 terminal.

3. The power transformation device of claim 1, wherein the Ethernet terminal is installed in the powered device.

4. The power transformation device of claim 1, wherein the electromagnetic interference suppression unit is a common-mode choke.

5. The power transformation device of claim 1, wherein the electromagnetic interference suppression unit is a bead inductor.

6. The power transformation device of claim 1 further comprising a clamping unit coupled between an output end of the bridge rectifier and the powered device.

7. The power transformation device of claim 6, wherein the clamping unit is a Zener diode.

8. A power transformation device of a powered device in a power over Ethernet system comprising:
   a first transformer coupled between a fourth pin and a fifth pin of an Ethernet terminal;
   a second transformer coupled between a seventh pin and an eighth pin of the Ethernet terminal;
   an electromagnetic interference suppression unit coupled between a center tap of the first transformer and a center tap of the second transformer; and
   a bridge rectifier coupled to the electromagnetic interference suppression unit, for rectifying power outputted from the center taps of the first transformer and the second transformer via the electromagnetic interference suppression unit, so as to provide power for the powered device.

9. The power transformation device of claim 8, wherein the Ethernet terminal is an RJ-45 terminal.

10. The power transformation device of claim 8, wherein the Ethernet terminal is installed in the powered device.

11. The power transformation device of claim 8, wherein the electromagnetic interference suppression unit is a common-mode choke.

12. The power transformation device of claim 8, wherein the electromagnetic interference suppression unit is a bead inductor.

13. The power transformation device of claim 8 further comprising a clamping unit coupled between an output end of the bridge rectifier and the powered device.

14. The power transformation device of claim 13, wherein the clamping unit is a Zener diode.

15. A power transformation device of a powered device in a power over Ethernet system comprising:
- a first transformer coupled between a first pin and a second pin of an Ethernet terminal;
- a second transformer coupled between a third pin and a sixth pin of the Ethernet terminal;
- an electromagnetic interference suppression unit coupled between a center tap of the first transformer and a center tap of the second transformer; and
- a first bridge rectifier coupled to the electromagnetic interference suppression unit, for rectifying power outputted from the center taps of the first transformer and the second transformer via the electromagnetic interference suppression unit, so as to provide power for the powered device;
- a third transformer coupled between a fourth pin and a fifth pin of the Ethernet terminal;
- a fourth transformer coupled between a seventh pin and an eighth pin of the Ethernet terminal; and
- a second bridge rectifier coupled between a center tap of the third transformer and a center tap of the fourth transformer, for rectifying power outputted from the center taps of the third transformer and the fourth transformer, so as to provide power for the powered device.

16. The power transformation device of claim 15, wherein the Ethernet terminal is an RJ-45 terminal.

17. The power transformation device of claim 15, wherein the Ethernet terminal is installed in the powered device.

18. The power transformation device of claim 15, wherein the electromagnetic interference suppression unit is a common-mode choke.

19. The power transformation device of claim 15, wherein the electromagnetic interference suppression unit is a bead inductor.

20. The power transformation device of claim 15, wherein the second bridge rectifier is coupled between the center taps of the third transformer and the fourth transformer through an electromagnetic interference suppression unit.

21. The power transformation device of claim 20, wherein the electromagnetic interference suppression unit is a common-mode choke.

22. The power transformation device of claim 20, wherein the electromagnetic interference suppression unit is a bead inductor.

23. The power transformation device of claim 15 further comprising a clamping unit coupled between an output end of the first bridge rectifier and the powered device.

24. The power transformation device of claim 23, wherein the clamping unit is a Zener diode.

25. The power transformation device of claim 15, further comprising a clamping unit coupled between an output end of the second bridge rectifier and the powered device.

26. The power transformation device of claim 25, wherein the clamping unit is a Zener diode.

27. A power transformation device of a powered device in a power over Ethernet system comprising:
- a first transformer coupled between a first pin and a second pin of an Ethernet terminal;
- a second transformer coupled between a third pin and a sixth pin of the Ethernet terminal;
- a third transformer coupled between a fourth pin and a fifth pin of the Ethernet terminal;
- a fourth transformer coupled between a seventh pin and an eighth pin of the Ethernet terminal;
- a switching unit comprising a first end coupled to a center tap of the first transformer, a second end coupled to a center tap of the second transformer, a third end coupled to a center tap of the third transformer, a fourth end coupled to a center tap of the fourth transformer, a first output end, and a second output end, for alternately outputting voltages of the first end and the second end or voltages of the third end and the fourth end; and
- a bridge rectifier coupled between the first output end and the second output end of the switching unit, for rectifying power outputted from the first output end and the second output end, so as to provide power for the powered device.

28. The power transformation device of claim 27, wherein the Ethernet terminal is an RJ-45 terminal.

29. The power transformation device of claim 27, wherein the Ethernet terminal is installed in the powered device.

30. The power transformation device of claim 27, wherein the bridge rectifier is coupled between the first output end and the second output end of the switching unit through an electromagnetic interference suppression unit.

31. The power transformation device of claim 30, wherein the electromagnetic interference suppression unit is a common-mode choke.

32. The power transformation device of claim 30, wherein the electromagnetic interference suppression unit is a bead inductor.

33. The power transformation device of claim 27 further comprising a clamping unit coupled between an output end of the bridge rectifier and the powered device.

34. The power transformation device of claim 33, wherein the clamping unit is a Zener diode.

* * * * *